(12) United States Patent
Nakajima et al.

(10) Patent No.: US 6,504,823 B1
(45) Date of Patent: Jan. 7, 2003

(54) NETWORK MONITORING SYSTEM AND METHOD THEREOF

(75) Inventors: Katsutoshi Nakajima, Shizuoka (JP); Yoshikazu Saito, Shizuoka (JP); Hiroshi Nishiyama, Shizuoka (JP); Kazuyoshi Unno, Shizuoka (JP); Akiyoshi Tomita, Shizuoka (JP); Akira Norizuki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/353,057

(22) Filed: Jul. 13, 1999

(30) Foreign Application Priority Data

Jul. 16, 1998 (JP) .......................................... 10-202159

(51) Int. Cl.[7] ................................................ H04J 1/16
(52) U.S. Cl. ....................... 370/241; 370/403; 370/452
(58) Field of Search ................................. 370/241–253, 370/254, 221–223, 402–405, 452, 460; 702/58; 709/250

(56) References Cited

U.S. PATENT DOCUMENTS

| | | | | |
|---|---|---|---|---|
| 4,855,993 A | * | 8/1989 | Hamada et al. ............. 370/223 |
| 5,544,077 A | * | 8/1996 | Hershey ...................... 702/58 |
| 5,867,484 A | * | 2/1999 | Shaunfield .................. 370/254 |

* cited by examiner

Primary Examiner—Hassan Kizou
Assistant Examiner—John Pezzlo
(74) Attorney, Agent, or Firm—Sughrue Mion, PLLC (57) ABSTRACT

A master node and slave nodes which are connected in a ring-like manner transmit commands in one direction, each of the nodes transmits a state monitoring command for monitoring the operational state of the network to its immediate upstream-side node, and the operational state of the network is monitored by a response from the immediate upstream-side node with respect to the state monitoring command. A traffic monitoring unit monitors the amount of traffic in the network and determines whether or not the amount of traffic is less than a predetermined value, and a start-command transmitting unit transmits a start command for instructing the start of transmission of the state monitoring command to each of the slave nodes if it is determined that the amount of traffic is less than the predetermined value.

6 Claims, 7 Drawing Sheets

| SENDER'S ADDRESS | DESTINATION ADDRESS | START COMMAND |
|---|---|---|

FIG. 4

| SENDER'S ADDRESS | DESTINATION ADDRESS | STATE MONITORING COMMAND |
|---|---|---|

NETWORK MONITORING SYSTEM AND METHOD THEREOF

BACKGROUND OF THE INVENTION

1. Field of the Invention

The present invention relates to a network monitoring system in which a master node and a plurality of slave nodes are connected in a ring-like manner by transmission lines, the master node and the plurality of slave nodes transmit state monitoring commands to monitor the network.

The present application is based on Japanese Patent Application No. Hei. 10-202159, which is incorporated herein by reference.

2. Description of the Related Art

The related network monitoring system is mounted in a vehicle, and this network monitoring system is configured such that a plurality of slave nodes, which include electrical equipment such as a radio, an amplifier, a compact disk player (hereafter referred to as the CD player), and a cassette, and a master node having an audio-visual controller (hereafter referred to as the AV controller) are connected in a ring-like manner by transmission lines. In such a ring-network monitoring system, communication using commands and data is mutually effected among the nodes, and the state of operation of the network is monitored.

Figure 6:
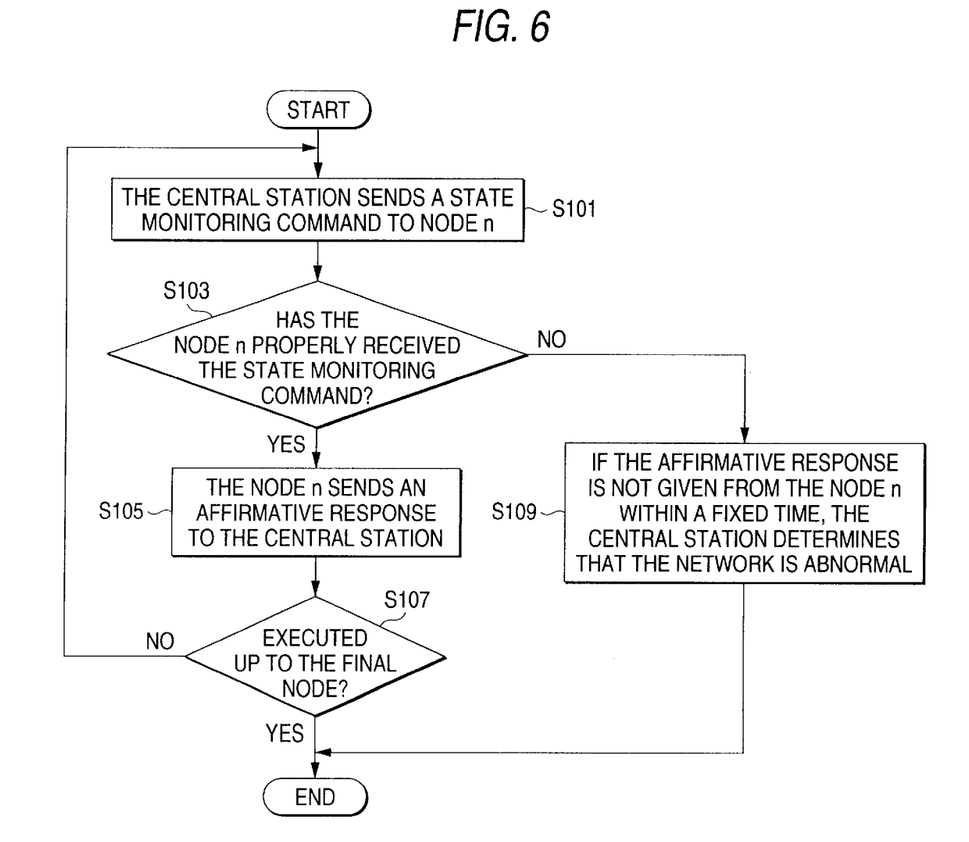
FIG. 6 is a flowchart illustrating the operation of one example of the related network monitoring system.

As a method of monitoring the operational state by using the ring-network monitoring system, two monitoring systems are known, for example. The first monitoring system is shown in the flowchart in FIG. 6. In FIG. 6, a particular node, such as a central station, first sends a state monitoring command for monitoring the operational state of the network to all the other nodes (Step S101).

On the other hand, all the other nodes respectively determine whether or not the state monitoring command has been normally received (Step S103), and if that node has normally received the state monitoring command, that node transmits an affirmative response to the central station (Step S105).

Further, a determination is made as to whether or not processing has been executed up to the final node (Step S107), and if processing has not been executed up to the final node, the operation returns to processing in Step S101 and the processing in Step S101 and thereafter is repeatedly performed.

On the other hand, if the affirmative response is not transmitted from each node to the central station within a fixed period of time, the central station determines that the network is abnormal (Step S109).

Figure 7:
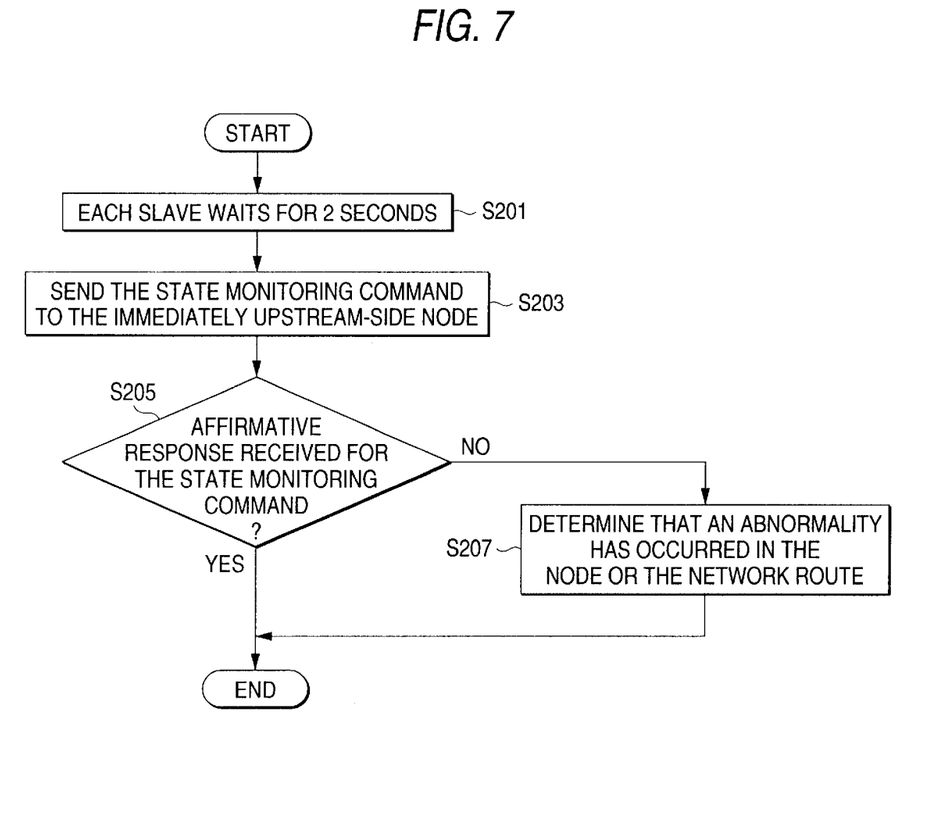
FIG. 7 is a flowchart illustrating the operation of another example of the related network monitoring system.
Figure 8:
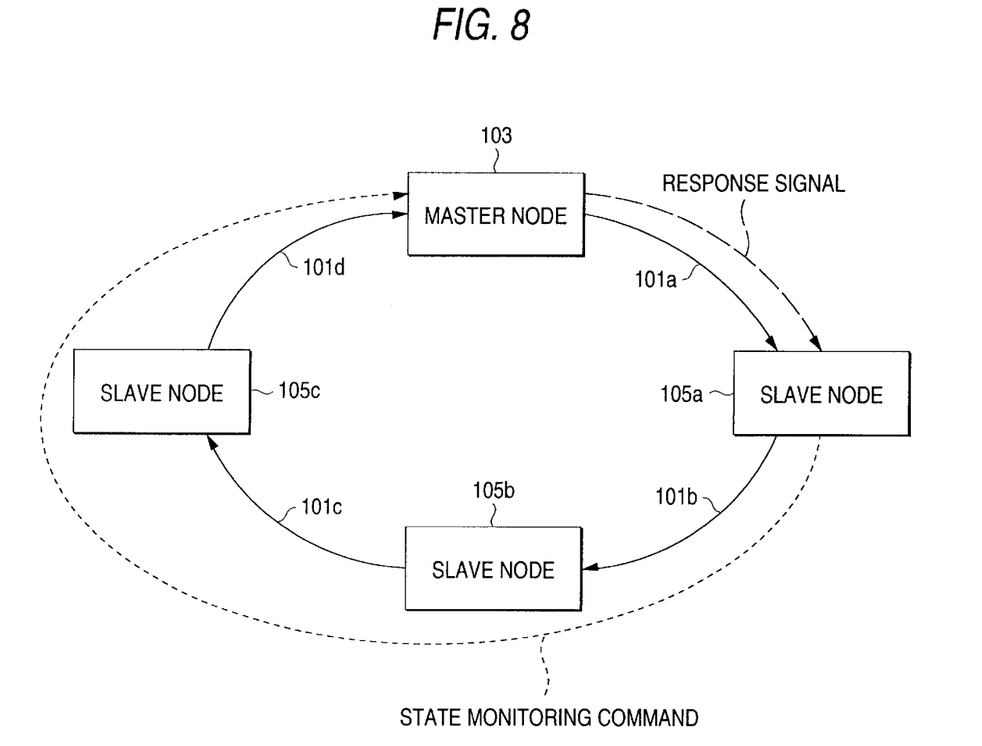
FIG. 8 is a block diagram of the related network monitoring system.

Next, a second monitoring method is shown in the flowchart in FIG. 7. The network monitoring system based on this method is shown in FIG. 8. As shown in FIG. 8, a master node 103 and a plurality of slave nodes 105 are connected in a ring-like manner by transmission lines 101a to 101d, and data, commands, and the like are transmitted in the direction indicated by the arrows.

In FIG. 7, each of the nodes (slave nodes) waits for a fixed interval (e.g., 2 seconds) (Step S201), and transmits the state monitoring command to its immediate upstream-side node (Step S203). For instance, a slave node 105a transmits the state monitoring command to its immediate upstream-side master node 103 through slave nodes 105b and 105c (in the route indicated by the dashed line).

Next, the node concerned determines whether or not there has been an affirmative response from its immediate upstream-side node with respect to the state monitoring command (Step S205). For example, the slave node 105a determines whether or not there has been an affirmative response from its immediate upstream-side master node 103 (in the route indicated by the long dashed line). If there has been the affirmative response, a determination is made that the network is normal, and the processing ends.

On the other hand, if there has not been the affirmative response, a determination is made that an abnormality has occurred in a node or in the route of the network (Step S207).

However, with the related network monitoring system shown in FIG. 6, since the commands from the slave nodes are concentrated in a particular node such as the central station, the burden on the particular node has been large.

In addition, with the related network monitoring system shown in FIG. 7, each of the nodes transmits the state monitoring command irrespective of the amount of traffic on the network. For this reason, in an event that another command of a higher degree of importance has occurred, there has been a possibility that the state monitoring command serves as a hindrance to the command of the higher degree of importance.

SUMMARY OF THE INVENTION

Accordingly, it is an object of the present invention to provide a network monitoring system and a method thereof which are capable of monitoring the operational state of a network without causing a decline in the network efficiency.

To achieve the above object, according to the first aspect of the present invention, there is provided a network monitoring system which comprises at least one master node, a plurality of slave nodes controlled by the master node, wherein the master and slave nodes are connected in a ring-like manner through transmission lines, each of the nodes transmits data and commands in one direction through the transmission lines and transmits a state monitoring command for monitoring an operational state of a network to an immediate upstream-side node, and the operational state of the network is monitored by a response from the immediate upstream-side node with respect to the state monitoring command, a traffic monitoring unit provided in the master node, the traffic monitoring unit monitoring an amount of traffic in the network and determining whether the amount of traffic is less than a predetermined value, and a start-command transmitting unit provided in the master node, the start-command transmitting unit transmitting a start command for instructing a start of transmission of the state monitoring command to each of the slave nodes when the traffic monitoring unit determines that the amount of traffic is less than the predetermined value.

In accordance with the first aspect of the present invention, the traffic monitoring unit monitors the amount of traffic in the network and determines whether or not the amount of traffic is less than a predetermined value, and the start-command transmitting unit transmits a start command for instructing the start of transmission of the state monitoring command to each of the slave nodes if it is determined that the amount of traffic is less than the predetermined value.

Namely, since the state of the network is monitored when the amount of traffic in the network is at a predetermined value, e.g., zero, it is possible to monitor the operational state of the network without causing a decline in the network efficiency.

According to the second aspect of the present invention, preferably, each of the slave nodes has a position, information unit managing relative position information that indicates order of a position of the node from the master node.

In accordance with the second aspect of the present invention, the slave node concerned is able to easily ascertain the order of the position of that node from the master node, on the basis of the relative position information managed by the position information unit.

According to the third aspect of the present invention, preferably, each of the slave nodes has a state-monitoring-command transmitting unit transmitting the state monitoring command at a command transmission time related to the relative position information of the position information unit, on the basis of the start command received from the master node.

In accordance with the third aspect of the present invention, the state-monitoring-command transmitting unit transmits the state monitoring command at a command transmission time related to the relative position information of the position information unit. Namely, since the slave nodes transmit the state monitoring commands at mutually different times, it is possible to avoid collisions between the state monitoring commands of their own nodes and the state monitoring commands of the other nodes.

According to the fourth aspect of the present invention, there is provided a network monitoring method. In the network monitoring method, first, at least one master node and a plurality of slave nodes controlled by the master node are provided. The master node and the slave nodes are connected in a ring-like manner through transmission lines, each of the. nodes transmits data and commands in one direction through the transmission lines and transmits a state monitoring command for monitoring an operational state of a network to an immediate upstream-side node, and the operational state of the network is monitored by a response from the immediate upstream-side node with respect to the state monitoring command. Further, the master node is caused to monitor an amount of traffic in the network and determine whether the amount of traffic is less than a predetermined value. Still further, the master node is caused to transmit a start command for instructing a start of transmission of the state monitoring command to each of the slave nodes when the master node determines that the amount of traffic is less than the predetermined value.

According to the fifth aspect of the present invention, preferably, the network monitoring method further comprises a step of causing each of the slave nodes to manage relative position information indicating order of a position of the node from the master node.

According to the sixth aspect of the present invention, preferably, the network monitoring method further comprises a step of causing each of the slave nodes to transmit the state monitoring command at a command transmission time related to the relative position information, on the basis of the start command received from the master node.

The above and other objects, features and advantages of the present invention will become more apparent from the following detailed description of the invention when read in conjunction with the accompanying drawings.

DETAILED DESCRIPTION OF THE PREFERRED EMBODIMENT

Figure 1:
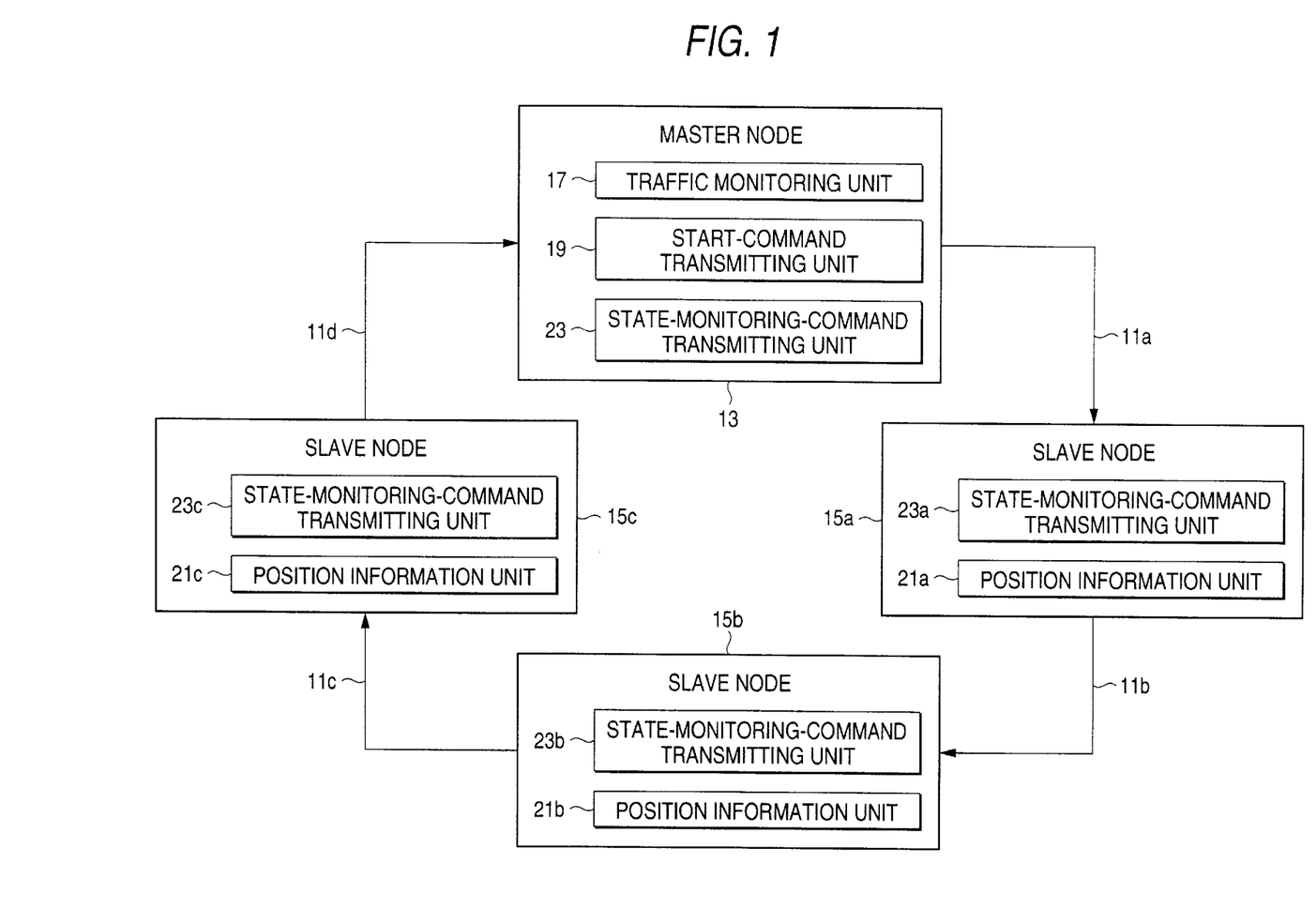
FIG. 1 is a block diagram of a network monitoring system in accordance with an embodiment of the present invention.

Referring now to the accompanying drawings, a detailed description will be given of an embodiment of a network monitoring system and a method thereof in accordance with the present invention. FIG. 1 shows a block diagram of the network monitoring system in accordance with the embodiment of the present invention.

The network monitoring system shown in FIG. 1 is mounted in a vehicle, for example, and a master node 13 and a plurality of slave nodes 15a to 15c are connected in a ring-like manner through transmission lines 11a to 11d to allow data and commands to be transmitted in the direction indicated by the arrows.

The slave nodes 15a to 15c are, for example, a CD player, a radio, and an amplifier. The master node 13 is such as an AV controller 1 which controls the operation of the equipment such as the CD player, the radio, and the amplifier.

The master node 13 has a traffic monitoring unit 17, a start-command transmitting unit 19, and a state-monitoring-command transmitting unit 23. The traffic monitoring unit 17 monitors the amount of traffic on the network, and determines the presence or absence of the amount of traffic on the network.

If it is determined by the traffic monitoring unit 17 that the amount of traffic is absent, the start-command transmitting unit 19 transmits a start command for starting the transmission of the state monitoring command to all the slave nodes by broadcast communication.

After the start-command transmitting unit 19 has transmitted the start command, the state-monitoring-command transmitting unit 23 transmits the state monitoring command to its immediate upstream-side node.

The slave nodes 15a to 15c have position information units 21a to 21c and state-monitoring-command transmitting units 23a to 23c, respectively. Each of the position information units 21a to 21c manages relative position information as to the order of the position of the node concerned from the master node 13, by using a position address.

For example, if it is assumed that the position address of the master node 13 is "0", then "1", "2", and "3" are consecutively assigned as position addresses starting with the slave node closest to the master node 13 in the data transmitting direction. For this reason, the position information unit 21a stores the position address "1", the position information unit 21b stores the position address "2", and the position information unit 21c stores the position address "3".

Each of the state-monitoring-command transmitting units 23a to 23c receives the start command from the master node 13, obtains a command transmission time by multiplying the value of the position address stored in the position information unit of its own by a fixed time (e.g., 10 ms), and transmits the state monitoring command to the immediate upstream-side node during this command transmission time.

In addition, on the basis of the presence or absence of reception of the affirmative response from the immediate upstream-side node, the master node 13 and each of the slave nodes 15a to 15c determine whether the operational state of the network is normal or abnormal. Namely, by transmitting a command to the immediate upstream-side node, each of these nodes checks the route of the overall ring network and checks for an abnormality in the commands and the like.

Figure 2:
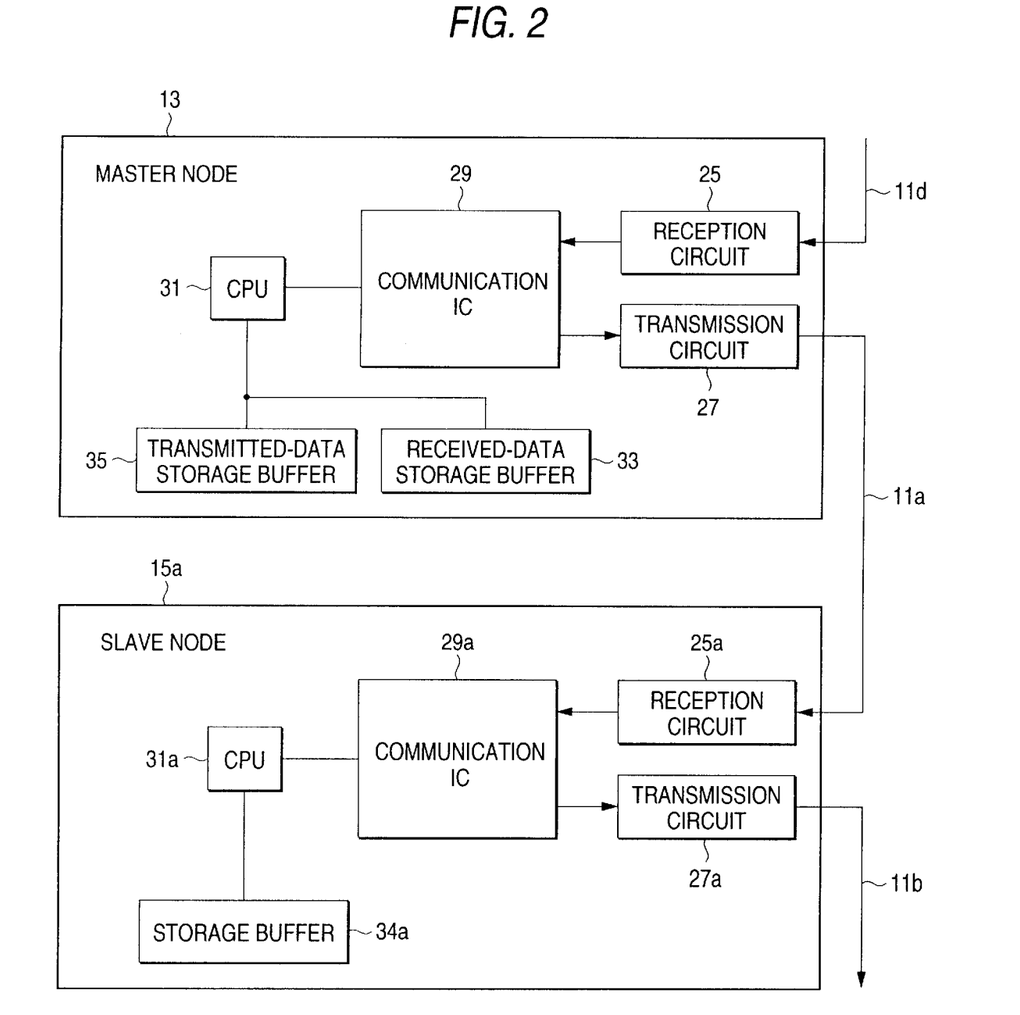
FIG. 2 is a detailed circuit diagram of a master node and slave nodes in accordance with the embodiment.

FIG. 2 shows a detailed circuit diagram of the master node and the slave nodes in accordance with the embodiment. The master node 12 has a reception circuit 25, a transmission circuit 27, a communication integrated circuit (communication IC) 29, a central processing unit (CPU) 31, a received-data storage buffer 33, and a transmitted-data storage buffer 35.

The slave node 15a has a reception circuit 25a, a transmission circuit 27a, a communication IC 29a, a CPU 31a, and a storage buffer 34. It should be noted that the slave nodes 15b and 15c are also configured in the same way as the slave node 15a.

Each of the reception circuits 25 and 25a to 25c receives commands and data from the transmission line 11, and outputs them to its own communication IC. If the received data (including a command) is data addressed to itself, each of the communication ICs 29 and 29a to 29c fetches the data, whereas if the received data is other than the data addressed to itself, each of the communication ICs 29 and 29a to 29c sends the data as it is to the transmission line 11, and if there is any data to be transmitted, each of the communication ICs 29 and 29a to 29c sends that data to be transmitted to the transmission line 11.

Each of the CPUs 31 and 31a to 31c stores the data received from the communication IC in the received-data storage buffer 33, reads the transmitted data stored in the transmitted-data storage buffer 35, and outputs it to the communication IC. The CPU 31 also serves as the traffic monitoring unit 17, the start-command transmitting unit 19, and the state-monitoring-command transmitting unit 23 which are mentioned above.

Each of the transmission circuits 27 and 27a to 27c transmits the data transmitted thereto from the communication IC to the transmission line 11. Storage buffers 34a to 34c are those for storing data and commands, and also serve as the aforementioned position information units 21a to 21c.

Figure 3:
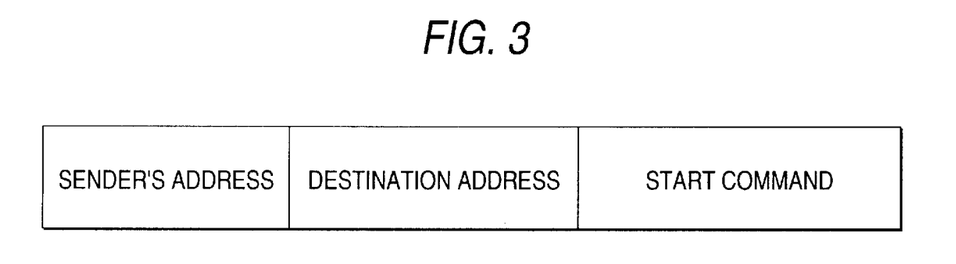
FIG. 3 is a diagram illustrating the format of a start command frame.

FIG. 3 shows the format of a start command frame. The start command frame has a sender's address, a destination address, and a start command. The sender's address shows the address of a node which sends the start command, and in this example it is the address of the master node 13. The destination address shows the address of a node to which the start command is sent. The start command is a command for starting the transmission of the state monitoring command.

Figure 4:
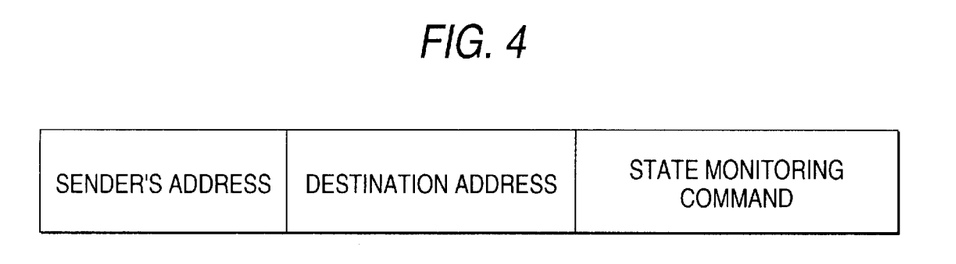
FIG. 4 is a diagram illustrating the format of a state-monitoring command frame.

FIG. 4 shows the format of a state-monitoring command frame. The state-monitoring command frame shown in FIG. 4 has a sender's address, a destination address, and a state monitoring command. The state monitoring command is a command for monitoring the operational state of the network.

Figure 5:
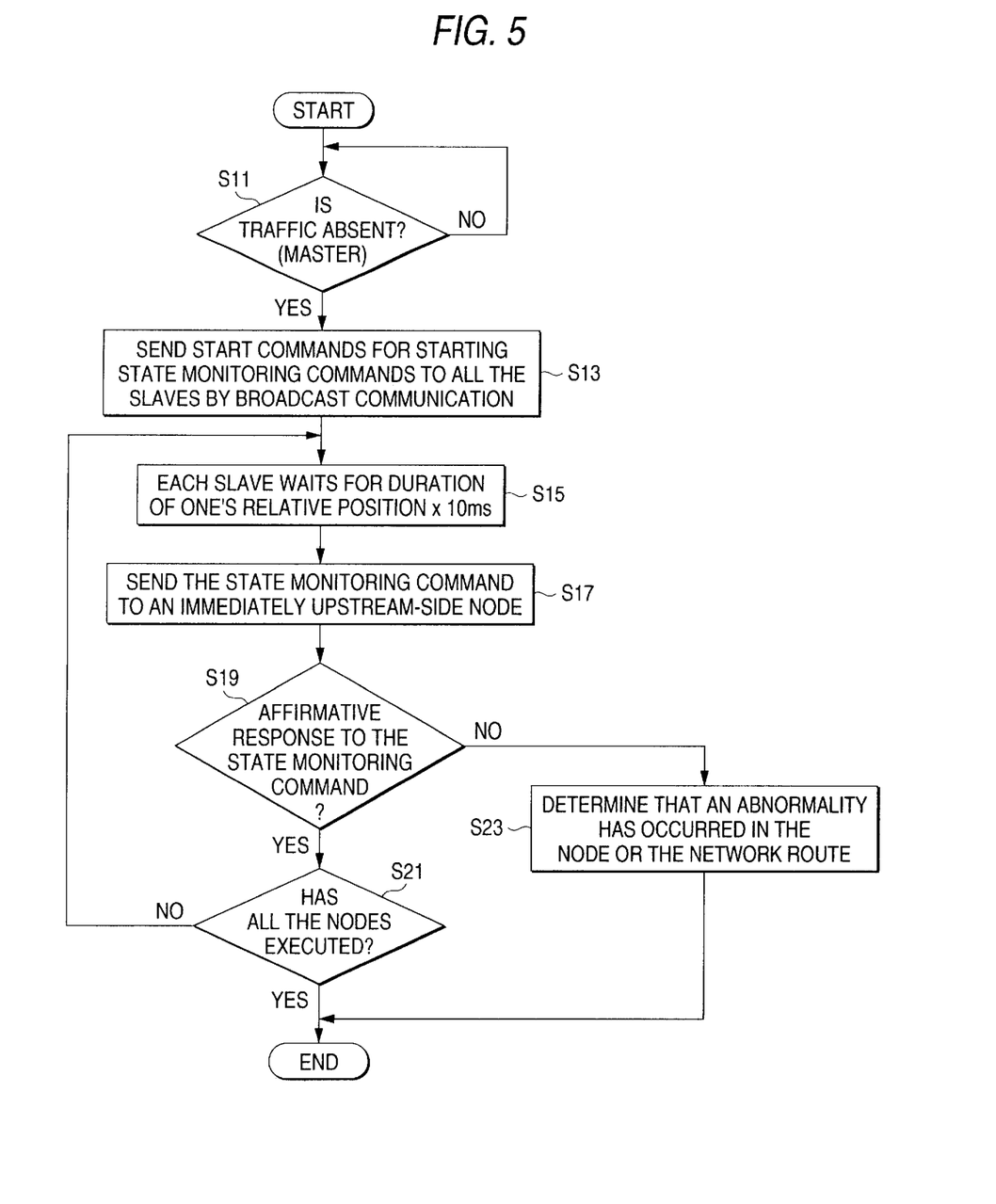
FIG. 5 is a flowchart illustrating the operation in the network monitoring system in accordance with the embodiment.

FIG. 5 shows a flowchart of the operation in the network monitoring system. Referring to FIG. 5, a description will be given of the operation in the network monitoring system, i.e., a network monitoring method.

First, in the master node 13, the traffic monitoring unit 17 monitors the amount of traffic of the network (transmission lines 11a to 11d), and determines whether or not the amount of traffic is absent (Step S11).

In monitoring the traffic, there are, for example, two monitoring methods which are described below. The first method is the case in which the master node has the initiative over the commands in the network, in which case the master node sends commands to the respective slave nodes, and the slave nodes return responses to the master node with respect to the commands. The master node thereby monitors the amount of traffic of the commands in the network.

The second method is the case in which the master node monitors the commands in the network. In this case, the master node stores all the commands flowing in the network in its own received-data storage buffer for a certain period of time, calculates the volume of commands per unit time (e.g., the number of commands per second), and determines whether or not that volume of commands is less than a predetermined value, thereby monitoring the amount of traffic.

Here, if it is determined by the traffic monitoring unit 17 that the amount of traffic is absent, the start-command transmitting unit 19 sends start commands for starting the transmission of the state monitoring command to all the slave nodes 15a to 15c by broadcast communication (Step S13).

Then, when each of the slave nodes 15a to 15c receives the start command from the master node 13, the state-monitoring-command transmitting unit reads the position address stored in its own position information unit, obtains a command transmission time by multiplying the value of the position address thus read by a fixed time (e.g., 10 ms), and, waits for this command transmission time (Step S15).

For example, in the slave node 15a, since the position address is "1", the command transmission time is 10 ms. In the slave node 15b, since the position address is "2", the command transmission time is 20 ms. In the slave node 15c, since the position address is "3", the command transmission time is 30 ms.

Then, each of the state-monitoring-command transmitting units 23a to 23c transmits the state monitoring command to its immediate upstream-side node after the lapse of the command transmission time subsequent to the reception of the start command (Step S17).

For example, the state-monitoring-command transmitting unit 23a of the slave node 15a transmits the state monitoring command to the master node 13, i.e., its immediate upstream-side node, after the lapse of 10 ms, i.e., its command transmission time, subsequent to the reception of the start command.

In addition, the state-monitoring-command transmitting unit 23b of the slave node 15b transmits the state monitoring command to the slave node 15a, i.e., its immediate upstream-side node, after the lapse of 20 ms, i.e., its command transmission time, subsequent to the reception of the start command.

Further, the state-monitoring-command transmitting unit 23c of the slave node 15c transmits the state monitoring command to the slave node 15b, i.e., its immediate upstream-side node, after the lapse of 30 ms, i.e., its command transmission time, subsequent to the reception of the start command.

Next, each of the slave nodes 15a to 15c determines whether or not there has been an affirmative response with respect to the state monitoring command sent to its immediate upstream-side node (Step S19). For instance, the slave node 15a determines whether or not there has been an affirmative response from the master node 13.

If there has been the affirmative response, a determination is made as to whether or not all the nodes have executed response processing (Step S21), and if all the nodes have not executed response processing, the operation returns to Step S15 to repeatedly perform the processing in Step S15 and thereafter.

Then, if there have been affirmative responses from all the nodes, a determination is made that the network is normal, and the processing ends.

On the other hand, if there has been no affirmative response, each node determines that there is an abnormality in a node or in the route of the network (Step S23).

Thus, the master node 13 monitors the amount of traffic, and if a determination is made that the amount of traffic is absent, the master node 13 transmits start commands instructing the start of transmission of state monitoring commands to all the slave nodes 15a to 15c.

Namely, since the state of the network is monitored when the amount of traffic is absent in the network, it is possible to monitor the operational state without causing a decline in the network efficiency.

In addition, since the slave nodes 15a to 15c transmit the state monitoring commands at mutually different times, it is possible to avoid collisions between the state monitoring commands of their own nodes and the state monitoring commands of the other nodes.

It should be noted that the present invention is not limited to the network monitoring system in the above-described embodiment. Although, in the embodiment, the traffic monitoring unit 17 in the master node 13 determines whether or not the amount of traffic is absent, an arrangement may be provided such that the traffic monitoring unit 17 determines whether or not the amount of traffic is less than a predetermined value.

What is claimed is:

1. A network monitoring system, comprising:

at least one master node;

a plurality of slave nodes controlled by the master node, wherein the master and slave nodes are connected in a ring-like manner through transmissions lines, each of the nodes transmits data and commands in one direction through the transmission lines and transmits a state monitoring command for monitoring an operational state of a network to an immediate upstream-side node, and the operational state of the network is monitored by a response from the immediate upstream-side node with respect to the state monitoring command;

a traffic monitoring unit provided in the master node, the traffic monitoring unit monitoring an amount of traffic in the network and determining whether the amount of traffic is less than a predetermined value; and a start-command transmitting unit provided in the master node, the start-command transmitting unit transmitting a start command for instructing a start of transmission of the state monitoring command to each of the slave nodes when the traffic monitoring unit determines that the amount of traffic is less than the predetermined value.

2. The network monitoring system according to claim 1, wherein each of the slave nodes has a position information unit managing relative position information that indicates order of a position of the node from the master node.

3. The network monitoring system according to claim 2, wherein each of the slave nodes has a state-monitoring-command transmitting unit transmitting the state monitoring command at a command transmission time related to the relative position information of the position information unit, on the basis of the start command received from the master node.

4. A network monitoring method, comprising the steps of:

providing at least one master node and a plurality of slave nodes controlled by the master node, wherein the master node and the slave nodes are connected in a ring-like manner through transmission lines, each of the nodes transmits data and commands in one direction through the transmission lines and transmits a state monitoring command for monitoring an operational state of a network to an immediate upstream-side node, and the operational state of the network is monitored by a response from the immediate upstream-side node with respect to the state monitoring command;

causing the master node to monitor an amount of traffic in the network and determine whether the amount of traffic is less than a predetermined value; and causing the master node to transmit a start command for instructing a start of transmission of the state monitoring command to each of the slave nodes when the master node determines that the amount of traffic is less than the predetermined value.

5. The network monitoring method according to claim 4, further comprising a step of causing each of the slave nodes to manage relative position information indicating order of a position of the node from the master node.

6. The network monitoring method according to claim 5, further comprising a step of causing each of the slave nodes to transmit the state monitoring command at a command transmission time related to the relative position information, on the basis of the start command received from the master node.

* * * * *